United States Patent [19]

McCullough

[11] Patent Number: 5,532,083
[45] Date of Patent: Jul. 2, 1996

[54] FLEXIBLE CARBON FIBER ELECTRODE WITH LOW MODULUS AND HIGH ELECTRICAL CONDUCTIVITY, BATTERY EMPLOYING THE CARBON FIBER ELECTRODE, AND METHOD OF MANUFACTURE

[76] Inventor: Francis P. McCullough, 104 Fir Dr., Lake Jackson, Tex. 77566

[21] Appl. No.: 280,708

[22] Filed: Jul. 26, 1994

[51] Int. Cl.⁶ .............................. H01M 6/42; H01M 6/48
[52] U.S. Cl. ........................ 429/210; 429/218; 252/502; 423/447.2
[58] Field of Search ................................ 429/210, 218; 423/447.2; 252/502, 182.1

[56] References Cited

U.S. PATENT DOCUMENTS

| | | | |
|---|---|---|---|
| 3,642,538 | 2/1972 | Zito | 429/101 |
| 3,658,592 | 4/1972 | Dey | 429/197 |
| 3,844,837 | 10/1974 | Bennion et al. | 429/194 |
| 4,009,323 | 2/1977 | Bennion et al. | 429/194 |
| 4,830,938 | 5/1989 | McCullough et al. | 429/149 |
| 4,837,076 | 6/1989 | McCullough et al. | 428/224 |

FOREIGN PATENT DOCUMENTS

| | | |
|---|---|---|
| 3231243 | 3/1983 | Germany. |
| 3215126 | 10/1983 | Germany. |

*Primary Examiner*—Kathryn Gorgos
*Attorney, Agent, or Firm*—Nis H. Juhl

[57] ABSTRACT

A novel flexible carbon article for an electrode is disclosed for use in an electrical storage device in which the flexible carbon article, such as a planar sheet of a plurality of substantially parallel fibers or ribbons, and in which the fibers or ribbons have a Young's modulus of less than 1 MM psi (6.89 Gpa). The invention also resides in an electrical energy storage device, such as a secondary battery, comprising a water impermeable housing having at least one and preferably more than two cells in series, wherein a battery containing at least two cells also contains at least one shared bipolar electrode made of the flexible carbon article. Each cell has a foraminous separator between each pair of electrodes and contains an electrolyte comprising an ionizable salt in a non-aqueous fluid. Also disclosed are methods of making the electrode from an unfiltered precursor polymer and from a sub-acrylic polymer.

27 Claims, 7 Drawing Sheets

FLEXIBLE CARBON FIBER ELECTRODE WITH LOW MODULUS AND HIGH ELECTRICAL CONDUCTIVITY, BATTERY EMPLOYING THE CARBON FIBER ELECTRODE, AND METHOD OF MANUFACTURE

FIELD OF THE INVENTION

The present invention generally relates to an electrically conductive flexible carbon article for an electrode and, more particularly, to an electrode made from an electrically conductive, flexible carbon article having a Young's modulus of less than 1 MM psi (6.89 GPa). The invention also resides in a battery employing said flexible carbon electrode, and a method of making the flexible carbon electrode. Preferably, the flexible carbon article forming the electrode is made from a multiplicity of fibers or ribbons having a specific resistivity of less than 0.5 ohm-cm, a surface area of from greater than 1 to about 150 $m^2/g$, and a bending strain value of less than 50%.

BACKGROUND OF THE INVENTION

Electrical energy storage devices, particularly batteries, which employ fibrous carbon or graphite electrodes and which operate in a non-aqueous electrolyte at ambient temperature are known from U.S. Pat. No. 4,865,931, issued Sep. 12, 1989 to F. P. McCullough et al, the subject matter of which is in its entirety incorporated herein by reference. The patent generally discloses a secondary battery comprising a housing having at least one cell positioned in the housing, each cell comprising a pair of electrodes of an electrically conductive carbonaceous material, a foraminous electrode separator for electrically insulating the electrodes from contact with each other, and an electrolyte comprising an ionizable salt in a non-aqueous fluid in each cell. The electrodes are characterized as carbonaceous electrodes having a Young's modulus of greater than 1 MM psi (6.9 GPa), but less than 55 MM psi (380 GPa).

A similar electrical storage device is disclosed in U.S. Pat. No. 4,830,938 to F. P. McCullough et al, issued May 16, 1989, the subject matter of which is incorporated herein in its entirety. This patent discloses a fibrous carbonaceous electrode which is characterized as having a Young's modulus of greater than 1 MM psi (6.9 GPa), but less than 75 MM psi (517 GPa), most preferably from 20 MM to 45 MM psi (138 GPa to 311 GPa), and a surface area with respect to the fibrous material of at least 0.1 $m^2/g$, most preferably less than 5 $m^2/g$. The patent additionally discloses a shared (bipolar) carbonaceous electrode which is capable of carrying a current from one cell to an adjacent cell without a current collector frame associated therewith and when employed as the electrode in a series of adjacent cells of a battery having but one terminal electrode provided with a collector frame at each end of the battery.

Although the batteries disclosed in the prior patents to McCullough et al provide a major advance in the battery arts, the electrodes require a special graphite material such as THORNEL® fibers (mesophase pitch based graphite fibers made by Amoco) which have a Young's modulus of from 45 to 55 MM psi, or PANEX® PWB-6 fibers (stabilized acrylic based carbon fibers made By Stackpole) which have a Young's modulus of from 33 to 38 MM psi. It is stated in the prior patent to McCullough et al that electrodes made from RPG graphite (Nuclear Grade Reinforced Pyrolitic Graphite) having a Young's modulus of less than 1 MM psi, or electrodes made from GRAFOIL® (a compressed graphite foil manufactured by Ucar Carbon Co. Inc., while having the required degree of carbonization, electrical conductivity, and surface area, do not have the required physical properties of Young's modulus and aspect ratio and thus have failed when used as the positive electrode in non-aqueous battery systems due to destructive intercalation of large anions from the electrolyte between the graphite layers.

Destructive intercalation of large anions between the carbon or graphite layers of an electrode and electrolyte causes instability which becomes a particular problem in electrical energy storage devices, particularly rechargeable batteries that operate with a non-aqueous electrolyte and having a cell voltage of greater than 2.5 volts. Such batteries require exacting standards during their manufacture and operation to prevent the introduction of gaseous water or water vapor into the batteries since the introduction of only minute quantities of water into a battery results in the electrolysis of the water molecule. Electrolysis of water molecules can take place during electrical charging of the battery at a potential of greater than 2.5 V, during storage in the charged state and during discharge of the battery, forming O, OH– and H+ ions with the OH– ions migrating to the positively charged cathode where electrolysis to O and $O_2$ takes place. The OH– and H+ cause a breakdown of such commonly used non-aqueous electrolyte materials such as propylene carbonate through catalysis, while highly reactive O and $O_2$ destroy the surface of the carbon or graphite electrode due to destructive intercalation. McCullough et al report that their battery is capable of operating with a water content of up to 300 parts per million (ppm) but that it will have a somewhat reduced cycle life. McCullough et al also report that if the water content should become onerous, that the battery can be disassembled, dried and reassembled in a dried state without substantial damage to its continued operation.

BRIEF DESCRIPTION OF THE INVENTION

The invention particularly resides in an electrically conductive flexible carbon article for an electrode, wherein said article is derived from a polymeric precursor material, said carbon electrode having a Young's modulus of less than 1 MM psi (6.89 GPa).

It has now been surprisingly found that an electrode made from a flexible carbon article having a Young's modulus of less than 1 MM psi (6.9 Gpa), preferably from about 0.3 MM psi to about 0.95 MM psi, and more preferably from about 0.7 MM psi to about 0.9 MM psi has the advantage of being flexible, non-brittle and formable into any desired shape.

The invention also resides in a flexible carbon electrode that can be made more easily and at a substantially lower manufacturing cost from an unfiltered polymeric precursor material such as, for example, an acrylic or sub-acrylic polymer that can contain from about 0.01 to about 5% by weight particulate matter having a diameter of less than about 0.1 microns. Sub-micron particles are naturally present in any polymeric material and thus will also be present in polymeric precursor materials that are extruded to form fibers for use in the manufacture of textile articles, for example. These particles are generally organic or inorganic materials which are insoluble in the polymeric precursor melt or dope. It is also contemplated and within the scope of the invention to introduce an additional quantity of sub-micron particulate matter, such as, for example, fumed silica, calcium oxide and various other inorganic materials such as silicates into the polymeric precursor material. It has been found that the addition of these sub-micron particles to the polymeric precursor material will prevent the formation of a high degree of order or crystallinity in the spun precursor material fiber. When the polymeric precursor fibers are subsequently heated and carbonized in a non-oxidizing atmosphere, the lack the stiffness, brittleness and high modulus that is normally associated with traditional carbon and graphitic fibers, while still exhibiting a low electrical resistivity and good uniform surface structure. These characteristics differentiate the flexible carbon fibers of the invention from high surface area absorptive carbon materials.

It is therefore an object of the invention to make a polymeric precursor material which is capable of being convened into a flexible carbon article from an unfiltered polymer (acrylic or sub-acrylic polymer) containing from about 0.01 to about 5% by weight particulate matter having a diameter of greater than about 0.1 microns.

It is known in the art and an accepted standard, imposed by the Federal Trade Commission, that the term "acrylic" applies to any long chain synthetic polymer composed of at least 85% by weight of acrylonitrile units. Carbon fibers made from acrylic precursor materials are generally wet or dry spun and are usually limited to circular cross-sections.

In accordance with a further embodiment of the invention, it has been discovered that a flexible carbon article derived from a polymeric precursor material can be made from a sub-acrylic polymer that is characterized by containing less than 85 mole percent acrylonitrile units and greater than 15 mole percent of another polymer, particularly a plasticizer such as a vinyl unit. More specifically, less than 85 mole percent acrylonitrile units can be blended with more than 15 mole percent of a plasticizer to render the blend more easily melt extrudable through an extrusion nozzle or nozzles while the polymer blend is in a heat softened condition. The so extruded, heat softened filament can be stretched and attenuated, while under tension, to form a finer denier filament having a relatively smaller diameter as compared to extruded fibers made from a standard acrylic resin. The sub-acrylic resin of the invention can also be advantageously employed in extruding filaments having a non-circular cross section.

The uniform surface structure presented by the carbon article of the present invention further provides a solution to the problem of destructive anion intercalation caused by large anions entering between the planar carbon layers of the positive electrode of a battery, for example. Large anions which enter between the planar carbon layers (usually referred to as "d-spacing" in the art) cause spalling or flaking of the carbon or graphite layers and can thus bring about a rapid degradation of the electrode when subjected to repeated electrical charging and discharging cycles. The novel flexible carbon article of the invention possesses the high degree of flexibility needed to form a variety of different electrode shapes or configurations for use in many types of energy storage devices in use today. Presently, conventional carbon and graphite electrodes made from high modulus fibers are limited in their applications in view of their extreme brittleness which makes their handling during fabrication difficult.

It is a further object of the invention to make a polymeric precursor material which is capable of being converted into a flexible carbon article from a sub-acrylic polymer selected from the group consisting of copolymers and terpolymers, wherein said copolymers and terpolymers contain less than 85 mole percent acrylic units and more than 15 mole percent of one or more plasticizer polymers that are copolymerized therewith, wherein the sub-acrylic resin is capable of being spun into very fine denier fibers. The article is easily assembled into an electrode, for example, for use in a rechargeable battery, and the like.

It is another object of the invention to make electrodes from a multiplicity of carbon fibers having either circular or other cross-sectional shapes, i.e. multilobal, crescent, star, or the like. It would also be advantageous to make the carbon fibers into a tubular shape.

It is another object of the invention resides in an electrode assembled from the flexible carbon article of the invention, particularly for use in electrical energy storage devices, having a surface area of from greater than 1 to about 150 $m^2/g$, and a specific resistivity of less than 0.5 ohm-cm.

Another object of the invention resides in a flexible carbon fiber having a nominal diameter of from 1 to about 15 micrometers, preferably from about 4 to about 8 micrometers, an aspect ratio of greater than 100:1, and a bending strain value of less than 50%.

It is another object of the invention to make flexible carbon fibers that are non-circular or tubular in cross-section, and that can, optionally, be provided with at least two interior passageways extending along the length of each fiber.

It is a further object of the invention to construct a flexible carbon article in the form of a ribbon having a planar surface of a relatively narrow width of up to about 0.5 in. (1.25 cm). The flexible carbon ribbon would be particularly useful in thin pouch batteries such as are used in photographic and medical applications such as flexible and durable sensing electrodes for use in EEG (Electroencephalogram) or EKG (Electrocardiogram) devices.

The invention additionally resides in a secondary energy storage device comprising a housing which is liquid water and water vapor impervious, said housing having an interior chamber forming a cell, a pair of electrodes positioned in said chamber, wherein said electrodes are electrically insulated or isolated from each other, each electrode having a current collector associated therewith, and each electrode being electrically connected to the exterior of the housing, wherein at least the positive electrode comprises an electrically conductive flexible carbon article having a Young's modulus of less than 1 million (MM) psi (6.89 GPa), and an electrolyte in said cell comprising an ionizable salt in a non-aqueous liquid.

The invention further resides in a high performance bipolar secondary energy storage device comprising a gas and water vapor impervious housing, said housing forming a chamber the interior surface of which is electrically non-conductive, at least one electrically insulating separator wall for separating the chamber into at least a pair of terminal cells, each terminal cell containing a terminal electrode which is provided with a current collector, and each said terminal electrode being electrically connected to the exterior of the housing to facilitate the flow of stored energy out of and the charge of energy into the storage device, a bipolar electrode extending from one terminal cell into the adjacent terminal cell and forming counter electrodes with each said terminal electrode, wherein said terminal electrodes and said counterelectrodes in each cell are electrically isolated or insulated from each other, said bipolar electrode being formed of an electrically conductive, flexible carbon article having a Young's modulus of less than 1 MM psi (6.89 GPa), and an electrolyte in each cell comprising an ionizable salt in a non-aqueous liquid.

The invention additionally resides in a process of making flexible carbon filaments from a stabilized polymeric precursor material containing from about 0.01 to about 5% by weight particulate matter having a diameter of less than about 0.1 microns, preferably less than 0.001 microns.

The invention also resides in a process of making a flexible carbon filaments from a polymeric precursor material comprising a sub-acrylic resin selected from the group consisting of copolymers and terpolymers of acrylonitrile, wherein said copolymers and terpolymers contain less than 85 mole percent acrylic units and greater than 15 mole percent of one or more plasticizer polymers copolymerized therewith.

Definitions

The term "article" or "electrically conductive flexible carbon article" that can be assembled to form an electrode, and as used herein, applies to a multiplicity of fibers, fiber tows, or ribbons, a film, sheet, or board, a non-woven web or felt, or a woven, knit, or non-woven fabric made from continuous flexible carbon filaments or staple fibers. The article is constructed from a polymeric precursor material or pitch that has been heat treated in a non-oxidizing atmosphere and for a period of time sufficient to carbonize to a degree where the carbon content of the material is increased to greater than 85% and up to 99% by weight, preferably from about 95% to about 98% by weight.

A preferred polymeric precursor material is a sub-acrylic (as hereinbefore defined) resin in the form of fibers and in which the fibers are carbonized in accordance with the procedure described in U.S. Pat. No. 4,837,076, issued Jun. 6, 1989 to McCullough et al.

The term "carbon" used herein applies to a material having a carbon content of greater than 85% by weight. The term used herein includes "Carbon" which is generally known to have a carbon content of greater than 92% by weight, or "Graphite" which is known to have a carbon content of greater than 98% by weight.

The term "sub-acrylic resin" used herein applies to a long chain polymer which is selected from the group consisting of copolymers and terpolymers, wherein the copolymers and terpolymers contain less than 85 mole percent acrylic units but more than 15 mole percent of one or more plasticizer units, such as vinyl units, copolymerized therewith.

The term "unfiltered" used herein applies to polymeric precursor materials which, when in a melt phase and during manufacture, are not subjected to the usual microfiltration procedure to remove impurities, such as non-polymeric inclusions, from the precursor material. Unfiltered polymeric precursor materials that are usefully employed in the manufacture of flexible carbon articles of the invention can contain from about 0.01 to about 5% by weight particulate matter having a diameter of greater than about 0.1 microns, preferably less than 0.001 microns.

The term "polymeric blends" applies to a polymeric precursor materials that are suitable for forming the flexible carbon articles of the invention and that are blended with other polymers, preferably plasticizers which in the case of sub-acrylic materials, are present at levels of greater than 15%, generally from greater than 15% up to 35%, preferably from greater than 15% to about 25% by weight.

The term "polymeric material" or "polymeric precursor material" used herein includes any polymers that are capable of being carbonized to form the flexible electrically conductive carbon article of the invention. Polymeric materials that can be suitably employed are well known in the art and are exemplified by copolymers and terpolymers of polyacetylene, polyphenylene, polyvinylidene chloride, polyacrylonitrile, and the like. Mesophase pitch (petroleum or coal tar) containing particulate impurities or additives can also suitably be employed.

The term "plasticizer" or "polymeric plasticizer" used herein applies to any organic compound that can be added to or blended with a high polymer to facilitate processing and to increase the flexibility and toughness of the final product by internal modification (solvation) of the polymer molecule. Suitable plasticizers include, for example, vinyl chloride, methyl acrylate, methyl methacrylate, polyvinyl chloride and cellulose esters, phthalates, adipates, and sebacate esters, polyols such as ethylene glycol and its derivatives, tricresyl phosphate, caster oil, etc.

The term "bending strain" as used herein is as defined in Physical Properties of textile Fibers by W. E. Morton and J. W. S. Hearle. The Textile Institute, Manchester, pages 407–409. Accordingly, the percent bending strain on a fiber can be determined by the equation $S=(r/R)\times 100$ where S is the percent bending strain, r is the fiber radius and R is the radius of curvature of the bend. That is, if the neutral plane remains in the center of the fiber, the maximum percentage tensile strain, which will be positive on the outside and negative on the inside of the bend, equals $(r/R)\times 100$ in a circular cross section of the fiber.

The term "energy storage device" used herein applies to electrical storage devices that are rechargeable such as secondary batteries, accumulators, capacitors, fuel cells, and the like.

The term "aspect ratio" or "equivalent ratio" is defined herein as the length to diameter (l/d) ratio of a fiber or filament, or as the length to depth ratio when the carbon is formed as a planar film, sheet, ribbon, or the like.

DETAILED DESCRIPTION OF THE INVENTION

Figure 1:
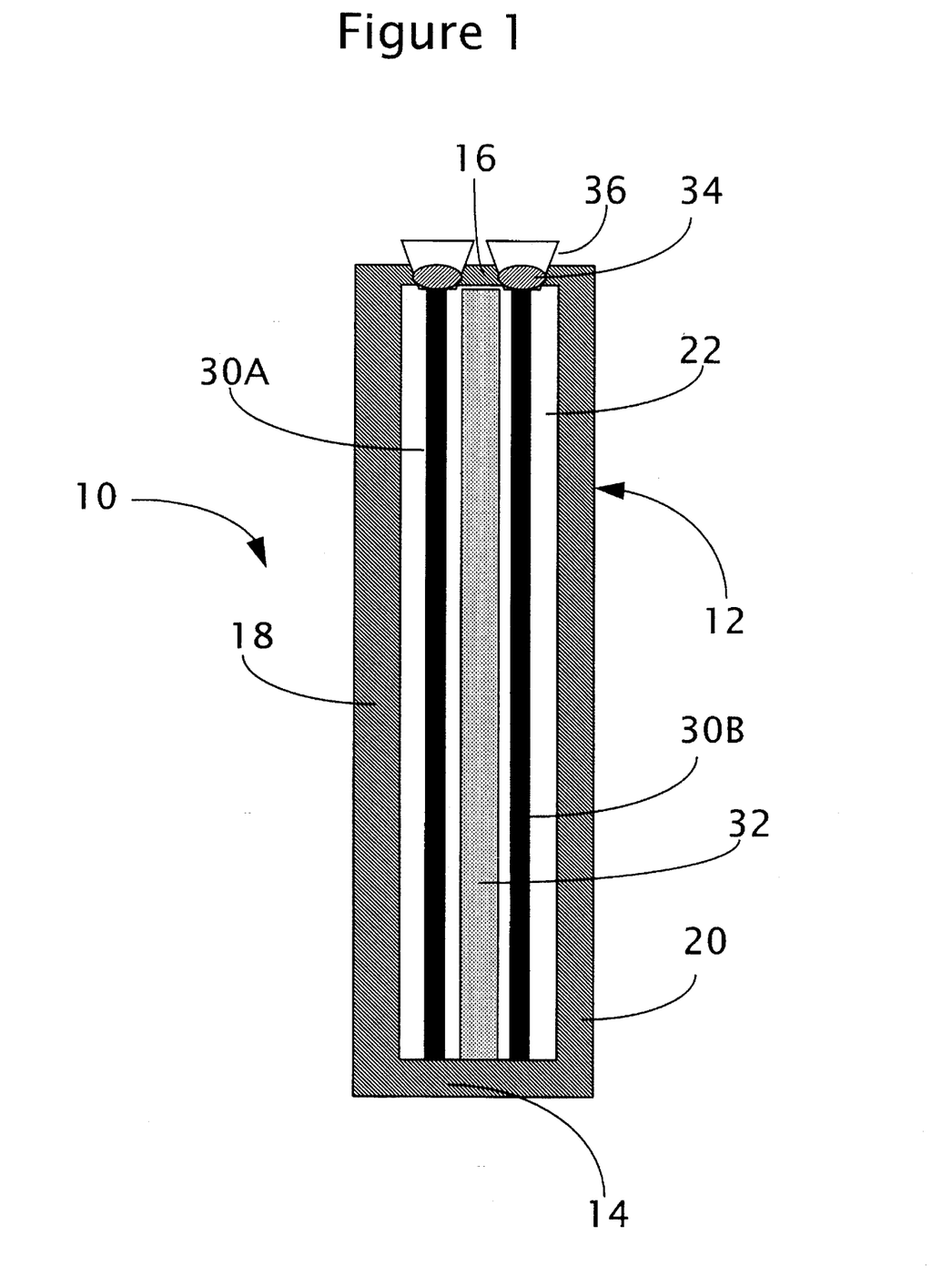
In FIG. 1, there is illustrated a cross sectional view of a battery consisting of a single cell and employing a pair of terminal electrodes made of the flexible carbon article of the invention.

In accordance with one embodiment of the present invention, as particularly illustrated in FIG. 1, there is provided a secondary battery 10 comprising a housing 12 having a generally rectangular or prismatic configuration. However, the housing can have any other desired shape, such as a generally planar board where the length, width and thickness can be adjusted to a particular end use and to accommodate any desired number of cells. It will be apparent that the battery of the invention can be constructed of any other symmetrical or non-symmetrical configuration. For example, an air and water vapor impervious polymer or a metal/plastic laminate can be molded into any desired shape for the housing which could then be inserted into the roof or door of an automobile, the wall or panel of a portable computer, etc. Moreover, the battery per se can be in the form of a flexible container or pouch that can be contained in a garment or that can be used for medical applications as a light weight power unit for a Holter Monitor(an EKG monitoring device), a portable insulin pump, an in vivo portable defibrillator units, i.e. TENS (Trans Electro Neuro Stimulator), etc.

With particular reference to FIG. 1, there is illustrated a battery, generally identified by reference number 10, which consists of a housing 12 having a bottom wall 14 and a top wall 16, a pair of side walls 18 and 20, and a pair of end walls (not illustrated) connecting the top and bottom walls to form an internal chamber 22. A pair of generally planar electrodes 30A and 30B, constructed in accordance with the teachings of the present invention, are positioned in the chamber in a facing relationship. An electrically non-conductive, ion permeable, planar, sheet like electrode separator 32 is positioned between the electrodes to prevent short circuiting between the electrodes while permitting ions to travel between the electrodes. It will be understood by persons skilled in the art that a planar sheet like separator that is electrically non-conductive is but one form of preventing contact and short circuiting between the electrodes. It is contemplated that the electrodes can be prevented from contacting each other by means such as electrically non-conductive spacers that extend between the electrodes. For example, the spacers could take the form of polymeric beads that are applied to the facing surface or surfaces of the electrodes and that are spaced at distances from each other sufficient to prevent contact between the electrodes. Instead of beads, spacing between the electrodes can also be obtained by means such as narrow strips of an electrically non-conductive polymeric material, or the like.

Although both of the electrodes are preferably made of the flexible carbon article of the invention, it is within the scope of the invention to construct the positive electrode, i.e. the cathode, of any other electrically conductive material such as, for example a metal or metal alloy, provided that the metal is resistant to the corrosive effect of the electrolyte.

The electrodes 30A and 30B are provided on at least one edge (when the electrodes are generally rectangular in shape) of the electrode body with a current or electron collector such as is illustrated, for example in U.S. Pat. No. 4,830,938 to McCullough et al, or as illustrated and described in U.S. Pat. No. 4,631,118, issued on Dec. 23, 1986 to F. P. McCullough et al, the subject matter of both of these patents being incorporated herein in their entirety by reference. Other methods beyond the scope of these above two references for depositing a copper current collector on the edge of the electrode such as plasma or vacuum vapor deposition, and the like, can also be employed.

In a preferred manner, the current collector 34 extends along at least one edge of each planar electrode 30A and 30B. In the embodiment illustrated, the current collector extends along the top edge of the electrode although it will be apparent that the current collector can also extend along a side or bottom edge of the electrode, or along all of the edges of the electrode to form a frame like configuration. An electrically conductive terminal 36 is connected to the current collector at a suitable position such as, for example at an end or at a midportion of the of the current collector 32. The current collector and at least a portion of the terminal is embedded within the housing wall and to the extent that the electrolyte does not come into contact with the current collector or terminal. Thus, only the carbon electrode is exposed to the electrolyte. This design is preferable to the design illustrated in U.S. Pat. No. 4,830,938 to McCullough et al where the current collector is positioned within the electrolyte of the cell and thus must be encapsulated with a polymeric material to protect the current collector from the corrosive effect of the electrolyte.

The flexible carbon electrode of the invention is preferably constructed from a multiplicity of carbon fibers that are preferably assembled as a planar sheet, with the fibers oriented in a substantially parallel relationship. In another preferred embodiment, the electrode is made up of a plurality of flexible carbon ribbons having an aspect or length to depth ratio of greater than 100:1. The electrodes can also be in the form of a film, sheet, web, woven or non-woven fabric, etc. It will be understood that the electrode shape can be changed to any desired configuration, depending only on the desired performance criteria of the electrode.

The electrodes can also be in the form of an assembly of a multiplicity of fibers, film, sheet, web, or fabric, for example, it may be desired to roll-up the electrodes in the form of a jelly roll such that the electrodes can be inserted into a cylindrical housing.

If the electrode is in the shape of a ribbon, the surface area of the ribbon can also be increased by creasing, embossing or simply roughening the surface, for example. If the electrode is in the shape of a web, it is preferable that the strands of the web are fused to present a somewhat porous body with a multiplicity of intersticial openings since this construction lends greater stability to the electrode and also obviates the need for bonding the peripheral edges of the electrode when the electrode is made of a multiplicity of fibers, for example.

Since the charge capacity of a cathode is proportional to its surface area, it is a preferred embodiment of the invention to construct the cathode of a multiplicity of fibers with a geometric configuration designed to present a maximum surface area to the negative ions of the electrolyte that migrate to the fiber surfaces of the cathode. In this regard, it is also desirable to construct the carbon fibers of a relatively small diameter of from about 1 to about 15 microns, preferably from about 4 to about 8 microns, since the diameter of the fibers is generally proportional to their surface area. Specifically, two fibers of a generally round or circular cross-section and having a diameter of 5 microns will present about 4 times the surface area of a single fiber having a diameter of 10 microns.

The carbon article employed for the electrodes of the invention has a surface area of from greater than 1 to about 150 $m^2/g$, preferably greater than 5 $m^2/g$, and more preferably from greater than 10 to 150 $m^2/g$, so long as the method employed to increase the surface area preserves the high electrical conductivity (low specific resistivity) of the article. The surface area of the carbon article that can be used for the electrodes of the invention can be substantially higher compared to the much denser surface areas employed with the carbon or graphitic electrodes taught in the prior art that generally prefer a surface area that is less than one would associate with activated absorptive carbon, which has a surface area of from 50 to 2000 $m^2/g$. The reason for the use of carbon articles of the invention having a higher surface area lies in the fact that the cross-sectional geometry is preferably changed from the typical circular cross- section of the prior art to a non-circular cross-section such as, for example, a multi-lobal, crescent, rippled or star shaped cross-section which enhance the surface area for a given diameter while preserving the surface structural characteristics which provide for good electrical conductivity. Beneficially, the higher surface area provides a substantial increase in the storage capacity and performance of the storage device.

In a preferred embodiment, the housing is constructed of a plastic/metal/plastic laminate in which the interior plastic layer of the housing is electrically non-conductive and chemically resistant or inert to the electrolyte. It will be understood that it is not essential to select a polymeric material that is electrically non-conductive for the interior surface of the housing since it is also possible to electrically isolate the electrodes from an electrically conductive interior housing surface such as, for example, by placing the electrodes at a distance from the interior surface sufficient to prevent contact therewith. Alternatively, spacing members may be placed at intervals between the electrodes and the interior housing wall to assure that no contact occurs between the wall and the electrodes. It is preferred, however, to construct the housing of a metal/plastic or plastic/metal/plastic laminate since laminates are particularly suitable as housings for secondary storage devices because of their light weight, formability, impact resistance, electrical characteristics and gas and water vapor impermeability. More specifically, in a plastic/metal/plastic laminate structure, the outer polymeric layer can be made of a tough shock absorbing polymeric material that would also serve as a protective layer for the intermediate gas and vapor impervious metal layer. The metal layer can be formed of any metal although it is preferred to use a relatively thin aluminum, magnesium (or magnesium or aluminum alloys) or copper foil. The inner, electrically non-conductive, layer can serve as a protective layer for the intermediate metal layer to prevent contact of the metal layer with the electrolyte and thus prevent corrosion of the metal layer. Construction materials and methods of construction are described in U.S. Pat. No. 4,830,938.

The housing contains an electrolyte. A preferred electrolyte for a secondary battery is a mixture of an ionizable salt dissolved in a non aqueous, non-conducting liquid or paste. Alternatively, the electrolyte per se can be ionizable to some extent as well as any non-conducting solid through which ions will be transported under the influence of an electrical charge and discharge as more fully explained in U.S. Pat. No. 4,830,938 to McCullough et al. The electrolyte preferably consists of a non-conductive, chemically stable, non-aqueous solvent for an ionizable salt or salts, wherein the ionizable salt is dissolved in the solvent. One can employ as the solvent those compounds that are generally known in the art such as, for example, compounds having oxygen, sulfur, and/or nitrogen atoms bound to carbon atoms in an electrochemically non-reactive state. Preferably, one can employ nitriles such as acetonitrile; amides, such as dimethyl formamide; ethers, such as tetrahydrofuran; sulfur compounds, such as dimethyl sulfite, and other compounds such as ethylene carbonate, or various blends of the above mentioned solvents. It is, of course, to be understood that the solvent itself can be ionizable under conditions of use sufficient to provide the necessary ions in the solvent. Thus, the ionizable salt must be at least partially soluble and ionizable either when it is dissolved and goes into solution into the solvent or upon liquefaction. While it is to be understood that slightly soluble salts are operable, it will be recognized that the rate of electrical charging and discharging can be adversely affected by the low concentrations of such salts in solution.

Ionizable salts which can be employed in the practice of the invention are those taught in the prior art and include salts of the more active metals, such as, for example, the alkali metal salts, preferably lithium, sodium or potassium, or mixtures thereof containing stable anions such as perchlorate ($ClO_4^-$), $CF_3SO_3^-$, tetrafluoroborate ($BF_4^-$), hexafluoroarsenate ($AsF_6^-$), hexafluoroantimonate ($SbF_6^-$), or hexafluorophosphate ($PF_6^-$).

It is preferred that the electrolyte (solvent and salt) is substantially water-free, that is, contains less than about 100 ppm of water, preferably less than 1 ppm water. Of course, if the electrolyte contains more than the desired amount of water, it can be dried as for example, over an activated zeolite 5A molecular sieve. Such a drying agent can also be introduced into the finished battery to ensure that the level of water does not exceed the ability of the cathode to neutralize the free hydroxyl ions that may be present in the electrolyte. The electrolyte should also be such as to permit ions (anions and cations) of the ionizable salt to move freely through the solvent as the electrical potential of charge and discharge move the ions to and from their respective poles (electrodes).

Figure 2A:
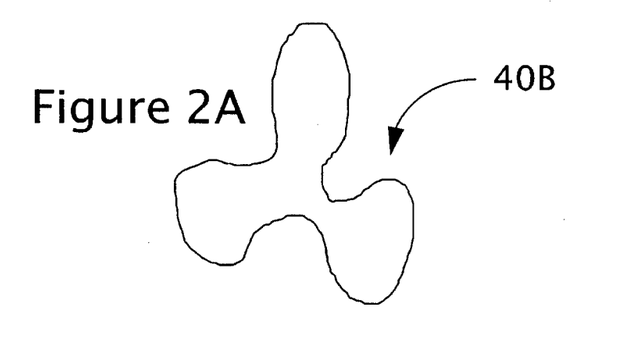
FIGS. 2A, 2B and 2C are cross sectional views of carbon articles in the form of fibers having non-circular cross-sectional configurations.
Figures 2B, 2C:
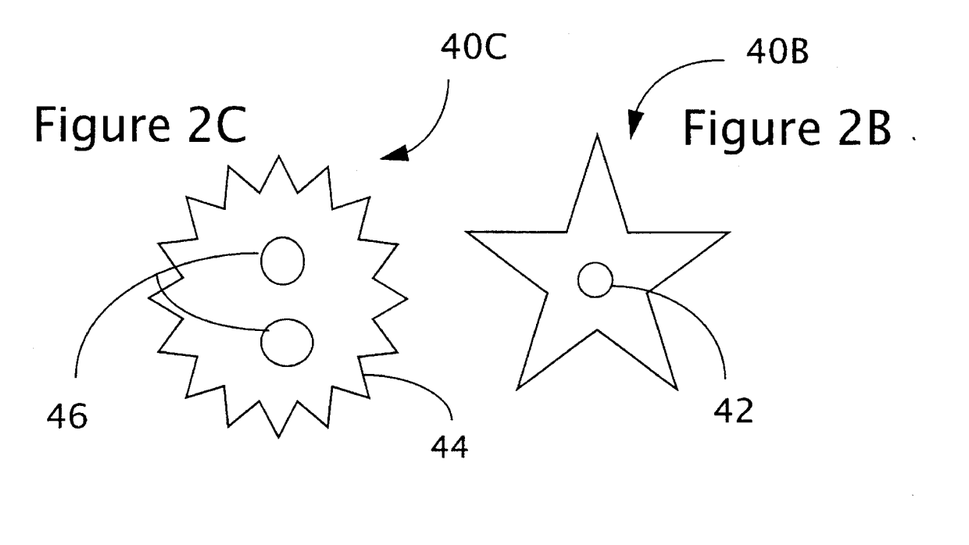

With particular reference to FIG. 2, there are illustrated, in cross-section, three embodiments of carbon fiber having a non-circular configuration such as can be usefully employed for the electrodes of the invention. With particular reference to FIG. 2A, there is illustrated a fiber 40A having a tri-lobal cross-sectional shape which presents an enlarged surface area, for a given outer fiber diameter, as compared to a similar fiber of a circular cross-sectional shape. The enlarged surface area allows for a substantially higher ion density to the ions of the electrolyte as compared to a fiber having a generally circular cross-section. In another embodiment illustrated in FIG. 2B, the fiber 40B has a cross-sectional shape of a star which also presents an enlarged surface area as compared to a fiber having a circular cross-section. The fiber can also be provided with a central passageway 42 extending along the length of the fiber. Since most of the electron activity is concentrated on the outer peripheral portion of the fiber, a hollow or tubular fiber represents a saving in the polymeric material without any sacrifice in performance. In another embodiment illustrated in FIG. 2C, the fiber 40C has a cross-sectional shape more likened to a toothed wheel or a circular fiber that is provided with a multiplicity of serrations 44 on its outer surface. For the same reason as stated with regard to FIG. 2B, the fiber of FIG. 2C can also be provided with one or more passageways 46 extending along the length of the fiber. As shown, two passageways are located near the center of the fiber although any number of micron size passages can be incorporated into the fiber.

It will be understood that the non-circular configurations illustrated herein are representative of only a few types of cross-sectional configurations and that the fiber can be made in any shape during its manufacture and that such shape is limited only by limitations of making an extrusion die for extrusion of a polymeric precursor material through the die, the composition of the polymer, temperature, etc. The number of lobes or points of a star, or the like configuration in a fiber is somewhat limited by the fact that the heat softened polymer that is extruded from a die has a tendency to flow and thereby obliterate the cross-sectional shape to revert to a more nearly circular cross-section. For other cross-sectional shapes of fibers, reference is made to "Modern Textiles" by D. S. Lyle, 1982 John Wiley & Sons, Inc. particularly pages 52 and 53.

A preferred electrode structure consists of an assembly of a multiplicity of carbon fibers or ribbons that are arranged in the form of a generally planar sheet. In the case of fibers, the cross-sectional shape of the fiber is preferably geometrically altered to present a larger surface area to the electrolyte. Preferably, the electrically conductive carbon material of the electrode should have the following physical property criteria:

(1) A Young's modulus of less than 1,000,000 psi (6.9 GPa), preferably from about 0.3 MM psi to about 0.95 MM psi, more preferably from about 0.7 MM psi to about 0.9 MM psi.

(2) An aspect ratio of greater than 100:1. The aspect ratio is defined herein as the length to diameter l/d ratio of a flexible carbon article when in the form of a fiber or filamentous strand, or as the length to depth ratio when the flexible carbon article is formed as a planar sheet.

(3) The structural and mechanical integrity of the flexible carbon article, in whatever fabricated form it may be when assembled as an electrode, must be such that it does not require the presence of a support such as a pressure plate (face films or mesh) to maintain the carbon article in the desired sheet or plate like shapes preferably throughout at least 600 charge/discharge cycles. More preferably, the carbon article should be capable of sustaining more than 1000 electrical charge and discharge cycles without any appreciable damage due to spalling or flaking. Most preferably, no appreciable damage should occur after more than 1500 electrical charge and discharge cycles.

(4) The carbon article of the electrode should be capable of sustaining deep electrical discharges of greater than 80 percent of its electrical charge capacity for at least 600 cycles of electrical charge and discharge, and preferably greater than 90% for more than 800 electrical charge and discharge cycles.

(5) The carbon electrode should be capable of maintaining a discharge capacity of a greater than 400 coulombs per gram of carbon electrode material.

(6) A surface area with respect to the carbon article of greater than 1 $m^2/g$, preferably greater than 5 $m^2/g$, and more preferably from greater than 10 $m^2/g$ up to about 150 $m^2/g$. It will be understood that it is possible to use carbon articles that have a surface area as low as 0.1 $m^2/g$, but that such a low surface area will not provide the optimum in terms of the storage capacity or coulometric efficiency.

(7) Sufficient structural integrity of the electrode to retain its shape when in a planar configuration and without any support, i.e. other than the current collector associated with the terminal electrodes. It should therefor be possible to construct the electrodes of the invention of a size as small as 1 $in^2$ (6.45 $cm^2$) and as large as 144 $in^2$ (930 $cm^2$) or even larger. The edges of the bipolar electrodes are preferably coated with a polymeric material to prevent the edges from fraying. Suitable polymeric materials that can be used are polyethylene, polypropylene, PVC (polyvinyl chloride) or DERAKANE (TM) brand curable vinyl ester or epoxy resin coating compositions, or the like.

(8) The coulometric (coulombic) efficiency of cycling of an energy storage device comprising the carbon electrode of the invention should be greater than 90 percent, preferably greater than 95 percent and most preferably greater than about 98 percent.

(9) The secondary electrical energy storage device of the invention should be substantially free of water but should be capable of operating with a water content of up to 100 ppm without any reduction in life and without any need for disassembling, drying and reassembling of the storage device. Preferably, the storage device should contain less than about 10 ppm water, most preferably less than 1 ppm.

Accordingly, the carbon electrode, in a secondary storage device, having the physical properties herein before described should, at the very least, be capable of sustaining electrical discharge and recharge of more than 600 cycles at a discharge capacity of greater than 400 coulombs per gram of carbon material and at a coulometric efficiency of greater than 90% without any substantial irreversible change in dimensions (dimensional change of less than about 5%).

The flexible carbon article is obtained by heating a polymeric precursor material in a non-oxidizing atmosphere to a temperature above 950 degree(s) C. and for a time sufficient until electrically conductive. Precursor starting materials capable of forming the electrically conductive carbon article of the invention can be selected from pitch (petroleum or coal tar), polyacetylene, polyacrylonitrile, acrylic, sub-acrylic, polyphenylene, polyvinylidene chloride, and the like. The precursor starting material should have some degree of skeletal orientation, i.e., many of these materials either have substantial concentrations of oriented benzenoid structural moleties or moieties which are capable of conversion, on heating, to benzenoid or equivalent skeletal orientation at or near the surface because of the skeletal orientation of the starting material.

Exemplary of preferred precursor materials which exhibit such skeletal orientation on heating are assemblies of multi- or monofilament strands or fibers prepared from petroleum pitch or polyacrylonitrile. Such multi- or monofilament fibers are readily assembled into a generally planar sheet like product from a tow of more than 320,000 individual, substantially parallel fibers. In the case of tows containing a smaller number of fibers, e.g. up to 40,000 fibers, the smaller tows can be fabricated into a knitted or woven cloth-like product. One technique for producing a cloth from fibers or a fiber tow is disclosed in U.S. Pat. No. 4,005,183. A preferred method of fabrication of electrodes is to use heavy tows of 320,000 fibers, or more, in which the fibers are substantially parallel and in the form of a thin, planar sheet.

The stabilized precursor article, e.g. a planar sheet of a multiplicity of fibers or ribbons, is then heat treated in a non-oxidizing atmosphere and at a temperature, usually above 950 degree(s) C., and for a time sufficient to carbonize the article to be electrically conductive and so as to provide the article with the physical property characteristics herein before described under paragraphs (1) through (9). The article, in conjunction with an electron collector, is suitable for use as an electrode in the energy storage device of the present invention. The bipolar electrode may require a sizing or coating on the edges thereof to prevent fraying during assembly.

Advantageously, the carbonaceous precursor material is in the form of a continuous or non-continuous fiber which can be made into assemblies such as a fiber tow, a heavy tow of 320,000 or more fibers in the form of a relatively thin, planar sheet, or a woven or knitted fabric, a non-woven web, felt or paper-like planar sheet or board. However, acceptable results are obtained when yarns made from short fibers (about 1 to 10 cm long) are woven or knitted into a cloth-like product (provided such short fibers still have, when heat treated, the required physical properties herein before mentioned under (1) through (9). It is of course to be understood that while it is advantageous to form the precursor material, preferably in a stabilized state (such as is obtained by oxidation), into the desired form (knit, woven, sheet or felt) prior to carbonization, such construction can be done after carbonization. It is, of course, to be understood that the carbon article can be formed from a film precursor.

The degree of carbonization and/or graphitization does not appear to be a controlling factor in the performance of the article as an electrode for an electrical storage device except that it must be sufficient to render the article electrically conductive and sufficient to provide the aforementioned physical and mechanical properties under the designated use conditions. Carbon articles having from about 85 to 92 percent carbonization are referred to in the literature as partially carbonized. Articles having from 92 to 98 percent carbonization are referred to in the literature as a carbonized material, while materials having a carbonization of greater than 98 percent are referred to as graphitized. It has surprisingly been found that carbonaceous materials having a degree of carbonization of from 90 to 99 percent have failed as electrode materials unless the carbonaceous material has the required dimensional stability during electrical charge and discharge cycling. For example, RPG (a nuclear grade Reinforced Pyrolitic Graphite) graphite and GRAFOIL® (a compressed graphite foil containing 97% graphite without binder or resin, manufactured by Ucar Carbon Co. Inc., while having the requisite degree of carbonization, electrical conductivity and surface area, do not have the required physical properties of Young's Modulus, surface structural orientation, uniformity and aspect ratio and thus have failed due to destructive anion intercalation.

The preceding description with regard to the electrical energy storage device illustrated in FIG. 1, the fiber embodiments of FIG. 2, and the physical characteristics described under items (1) through (9) are generally applicable to the following energy storage devices illustrated in FIGS. 3 to 7 in which like reference numbers are used to indicate like parts as illustrated in the embodiment of FIG. 1.

Figure 3:
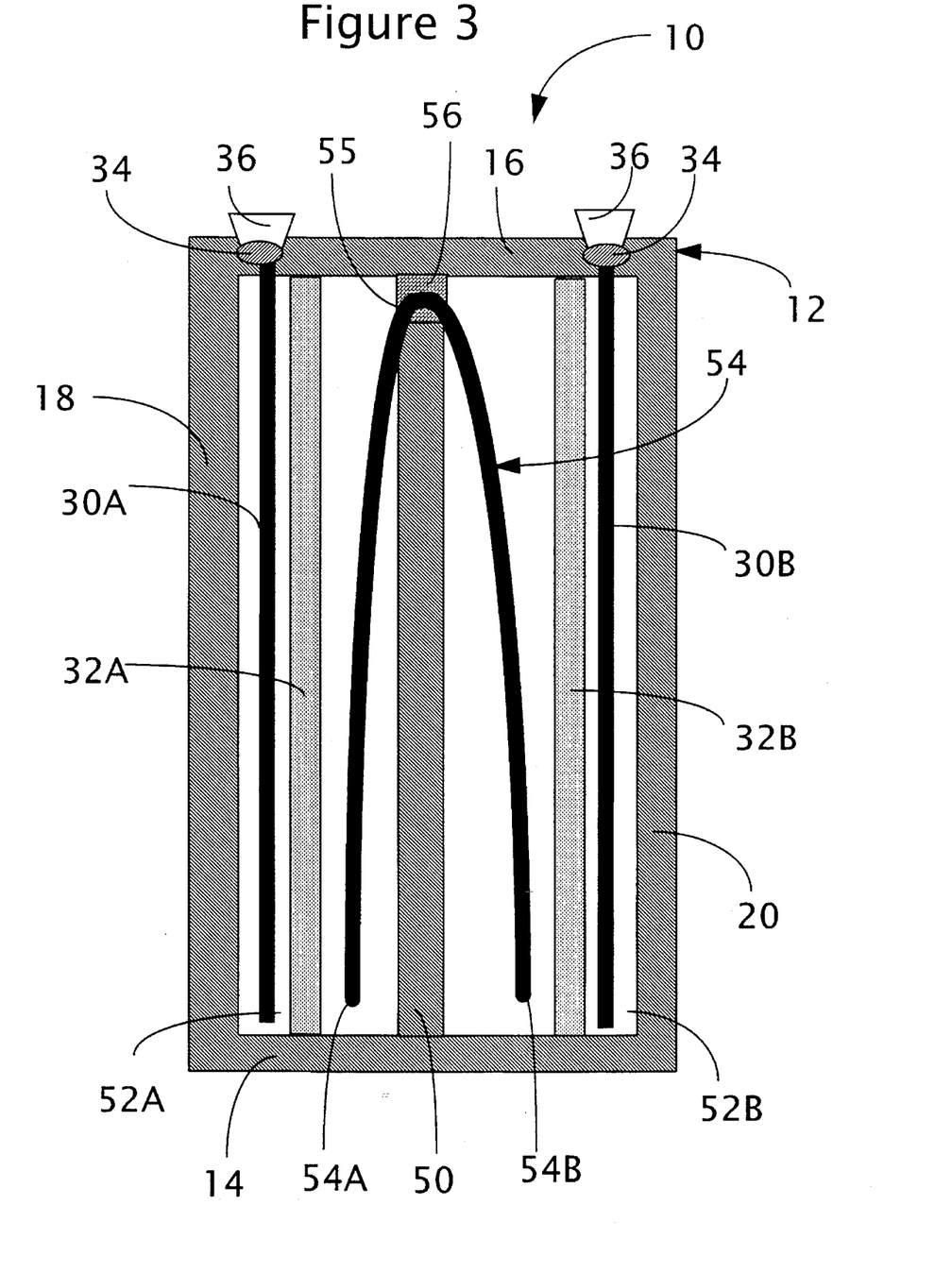
FIG. 3 illustrates a battery with a pair of terminal cells, each cell having a terminal electrode and a bipolar electrode that is shared by the terminal cells, and wherein portions of the composite electrode extend into each of the terminal cells to form a counter electrode with each of the terminal electrodes.

With particular reference to FIG. 3, there is illustrated a bipolar electrical energy storage device comprising a generally rectangular housing 12 which is provided with an internal cell separator wall 50 dividing the chamber into a pair of cells 52A and 52B which form, in effect, a pair of terminal cells. In a more preferred embodiment, a plurality of intermediate cells (not illustrated) can be provided between the pair of terminal cells. The number of cells being limited only by the particular use for which the battery is intended and the desired potential (terminal voltage). The separator wall 50 can be constructed of the same material as the housing wall or of a material, preferably a polymeric material, that is more impervious to the passage of gas or water vapor than the housing wall itself, requiring only that ions cannot pass therethrough. Each of the terminal cells 52A and 52B contain a terminal electrode 30A and 30B. A bipolar flexible carbon electrode 54, preferably constructed of a unitary planar sheet like structure and formed from a multiplicity of flexible carbon fibers, is positioned in the housing such that a mid portion 55 thereof is sealingly embedded or potted within a suitable potting resin 56 in the separator wall 50 and such that one portion 54A of the bipolar electrode 54 extends into the terminal cell 52A and another portion 54B of the bipolar electrode extends into the terminal cell 52B. In a preferred embodiment, the bipolar electrode is embedded at a midportion thereof within a wall of the housing itself with the portions 54A and 54B extending from the housing wall into the adjacent terminal cells 52A and 52B. As illustrated, the bipolar electrode exhibits a relatively sharp bend where the midportion of the electrode passes through the separator wall 50. A sharp bend in the flexible carbon electrode being entirely possible without breakage of the carbon article, i.e. the fibers, ribbon, etc. in view of the low modulus of the carbon article. When the separator wall is constructed of the same material as the housing walls, the housing and separator wall can be molded of a unitary structure.

While the bipolar electrode 54 is shown as a single unitary component having portions of equal length extending into adjacent terminal cells 52A and 52B, it is preferred that one or both portions of the bipolar electrode be constructed of a length such that one or both electrode portions can be folded upon itself to increase the total electrode area. The extent to which an electrode portion can be folded upon itself is only limited by the available volume of a cell compartment. In a preferred embodiment of the invention, the cathode(positive) portion of the bipolar electrode is folded upon itself one or more times to present a greater surface area to the migrating anions of the electrolyte during charge and discharge of the storage device. An anode (negative) portion of a smaller area being sufficient to accept a corresponding number of cations. It is generally preferable to have twice as much cathode area for a given anode area. Here again, the flexible nature of the carbon article allows for a folding over of one or both electrode portions without breakage of the carbon fibers, ribbons, etc.

Preferably, low ionic resistance, foraminous, ion permeable, electrically non-conductive separators 32A and 32B are positioned between each terminal electrode 30A and 30B and the portions 54A and 54B of the bipolar electrode 54 extending into each terminal cell to prevent electrical contact and short circuiting between the electrodes. The separator is generally in the form of a membrane or sheet of a polymeric material, glass fibers, and the like, as disclosed in U.S. Pat. No. 4,865,931 to McCullough et al. The separator can be of various forms of a membrane like material, e.g. fiberglass mats, polypropylene scrim or film, ion exclusion membranes, and the like. For example, a very thin, as little as 7 fibers thick, non-woven planar mat can be used as the separator, since no protection to dendritic puncture associated with secondary batteries having metal anodes is necessary for the device of this invention. It is also within the scope of the present invention to provide one electrode (preferably the cathode) of a pair of electrodes in each cell with an electrically insulative organic or inorganic coating that can be applied by dipping or spraying of a polymer in solution onto the surface of the electrode.

In accordance with a more preferred embodiment of the invention, a rechargeable battery can be prepared containing more than two cells (not illustrated) very similar to the battery illustrated in FIG. 3. The only difference between the cell of FIG. 3 and the preferred embodiment being in the provision of one or more intermediate cells. Thus, the terminal cells each contain a terminal electrode made from the aforedescribed flexible carbon article and the intermediate cells containing bipolar electrodes as previously described and shared with adjacent cells. Thus, an intermediate cell would contain two portions of a pair of bipolar electrodes extending into the intermediate cell through the separator walls, separating the intermediate cell from adjacent cells, into the intermediate cell.

In the construction of the secondary electrical energy storage device of the invention, conventional porous separators of fiberglass, polymeric materials including membranes, or composites of polymeric materials, can be employed to separate the positive and the negative electrodes from each other to prevent short circuiting between the electrodes. Preferably, the separator is a non-woven, porous, non-conductive material such as a melt blown or spun bonded polypropylene sheet or web, or a functionalized membrane provided that it has the desired degree of porosity and yet a sufficient tortuous path to prevent the carbon fibers of the electrode from penetrating through it, thus preventing electrical shorting. The porous separators also beneficially act as stiffeners or supports for the electrodes during assembly.

Energy storage devices which employ housings that are gas and water vapor impermeable and that are made of materials that are compatible with non-aqueous electrolytes are generally known in the art. Materials that are chemically compatible as a housing material include polyvinyl chloride, polyethylene, polypropylene, polytrifluoroethylene and related perfluorinated polymers, instant set polymers (ISP) which are formed from a rapidly solidifying reactive urethane mixture, the aramids, a metal clad with a non-conductive polymeric material such as an epoxy e.g. DER®331 or with a DERAKANE® brand of a curable vinyl ester epoxy resin, a ZETABON® brand of a plastic/metal/plastic laminate and/or glass or a metal oxide, fluoride, or the like. Housing materials found not to be suitable in the preferred propylene carbonate system include acrylics, polycarbonate and nylon. Acrylic polymers have a tendency to craze, polycarbonate polymers craze and become extremely brittle, while nylon (except for the aramids) is chemically reactive.

U.S. Pat. No. 4,830,938 to McCullough et al reports that the housing material must offer an absolute barrier against the transmission of water vapor from the external environment of the housing but that presently there is no known thermoplastic material alone which offers this absolute barrier against moisture at a thickness which would be useful for a battery housing. At present, only metals, for example aluminum, offer an absolute barrier against moisture or water vapor transmission at foil thicknesses of greater than 0.0015 in. (0.038 mm). It has also been shown that when laminated to other materials, aluminum foil as thin as 0.00035 in. (0.009 mm) can provide adequate protection against water vapor transmission. Suitable housings made of a metal-plastic laminate, CED-epoxy-coated metal (cathodic electro deposited), or metal with an internal liner of plastic or glass presently satisfies the requirements for both chemical compatibility and moisture barrier ability. Most of the cells and batteries built to date have been tested in either a dry box having a $H_2O$ level of less than 5 ppm, a glass cell or a double walled housing with the space between the walls filled with an activated molecular sieve, e.g. 5A zeolite.

The terminal electrodes include an electron collector that is conductively associated with at least one edge or a portion of the peripheral edge of the carbon article. The edge is preferably further protected by a material to insulate the collector and to protect the collector from contact with the electrolyte and its ions. The protective material must, of course, be unaffected by the electrolyte or the electrolyte ions. The current collector intimately contacts the carbon article of the terminal electrodes at least along one edge thereof when the carbon article is in the form of a planar cloth, sheet or felt. When the electrode is constructed in other shapes such as in the form of a spiral or tubular bundle of fibers, the ends of the bundle are provided with a current collector. It is also within the scope of the invention that electrodes in the form of a planar film, sheet, or the like, can be rolled up without a porous separator between the electrodes using fixed nonconductive spacers and with the opposed edges of each of the rolled up electrodes connected to a current collector. It is further contemplated that the electrodes when assembled in fibrous form can be intermingled with each other since the ion impervious coatings on the cathode prevents direct contact between the anode and the cathode to thereby prevent short circuiting between the electrodes.

While copper has been used as a current collector, any electro-conductive metal or alloy can be employed, such as, for example, silver, gold, platinum, cobalt, palladium, and alloys thereof. Likewise, while electrodeposition has been used in bonding a metal or metal alloy to the carbon material, other coating techniques (including melt applications) or electroless deposition can be employed as long as the edges or ends of the electrode, including a majority of the fiber ends are wetted by the metal to an extent sufficient to provide a substantially low-resistant electrical contact.

Current collectors made from a non-noble metal, such as copper, nickel, silver or alloys of such metals can also be used but must be protected from the electrolyte. Such metals are therefore preferably coated with a synthetic resinous material or an oxide, fluoride or the like which will not be attacked by the electrolyte or undergo any significant degradation at the operating conditions of a cell.

In the cell of the invention, it is also possible to use inductive coils imbedded in the housing material, connected to the terminal electrodes to charge the storage device. An additional advantage of the present design is that the cell is reversible, that is to say, the cell can be connected in a positive-negative mode and on negative can be reversed to a negative-positive mode without damage to the electrodes.

Figures 4, 4A:
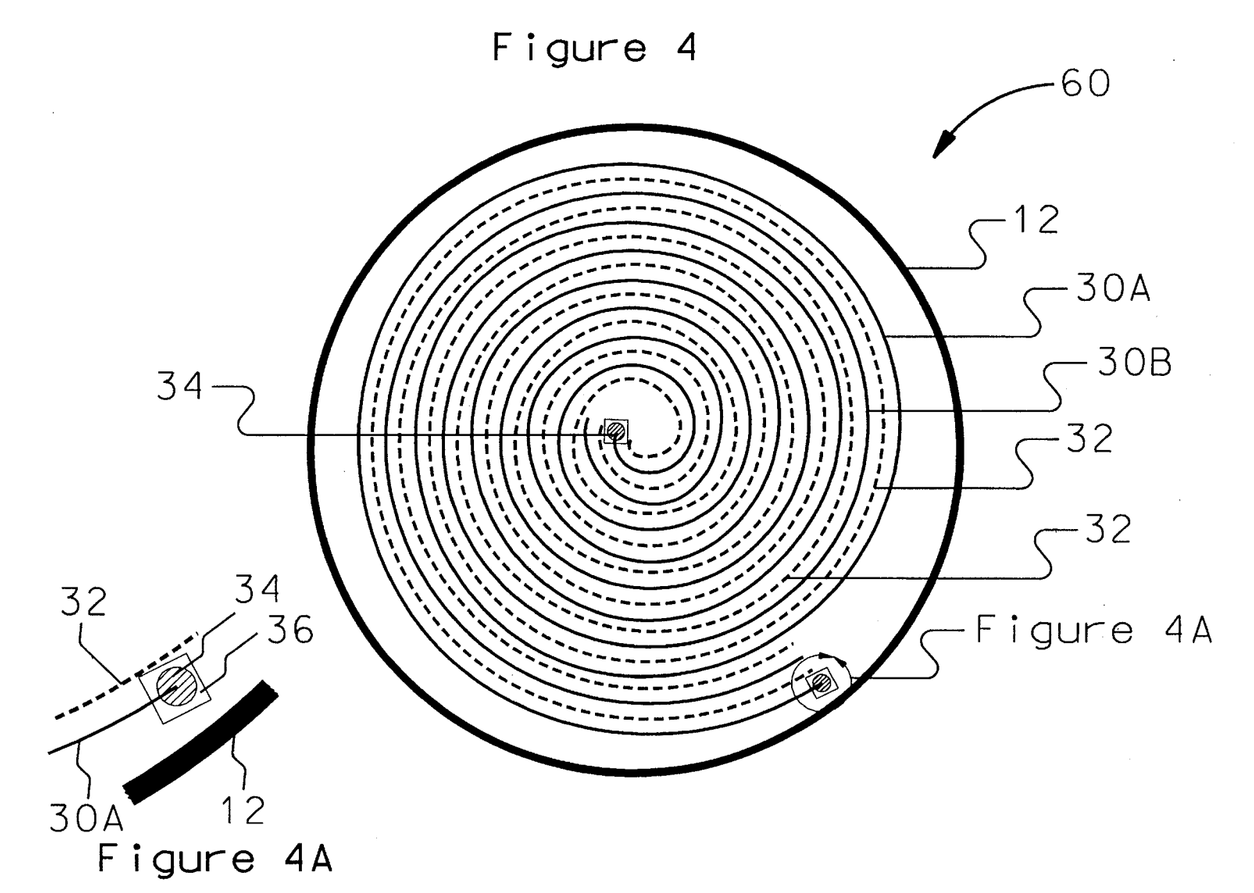
FIG. 4 is a cross-sectional view of a battery having a housing of a generally cylindrical shape and containing a pair of flexible carbon electrodes that are rolled up into a spiral or jelly roll type configuration and positioned in the cylindrical housing.
FIG. 4A is an enlarged sectional view of the electron collector and terminal attached to one end of an electrode.

The preceding discussion with regard to the electrical energy storage devices and fibers illustrated in FIGS. 1 to 3 are generally applicable to the remaining cell designs illustrated in FIGS. 4 to 7. With particular reference to FIGS. 4 and 4A, there is illustrated in a cross-sectional view, an energy storage device 60 comprising a housing 12 of a generally cylindrical shape and containing a pair of flexible carbon electrodes 30A and 30B that are rolled up into a spiral or jelly roll type configuration and positioned within the cylindrical housing. An electrically non-conductive, ion permeable and planar sheet like separator 32 is positioned between the pair of electrodes to prevent contact and electrical short circuiting between the electrodes. The space between the electrodes and the separator is filled with an electrolyte in liquid or paste form. As illustrated in the enlarged view of FIG. 4A an electron collector 34 is provided to extend along an edge of each of the electrodes.

A terminal 36 is attached to the electron collector at any convenient location along the length of the electron collector. Thus, the electron collector and terminal on one electrode can be embedded within the polymeric material forming the top wall of the cylinder while the electron collector and terminal on the other electrode can be embedded within the polymeric material forming the bottom wall of the cylinder so that the terminals will extend from opposite ends of the storage device. It would also be possible to connect the electron collectors and terminals to the edges of the electrodes so that they would be embedded in either of the top or bottom walls. However, this design offers a greater possibility that the electron collectors will come into contact with each other and thus presents a somewhat greater engineering problem. However, the design presents some advantages in the end use of, for example a rechargeable battery where external connections to the battery are preferably made at one end of the battery. As shown in FIG. 4, the electron collector and terminals can be attached to the edges of the electrodes so that one terminal extends from the center of the top or bottom wall, while the other terminal extends close to the outer peripheral edge of the top or bottom wall. Another modification (not shown) includes the feature that one or both electrodes can be folded over at their mid-portions. The folded over electrodes are then rolled up to form the same spiral configuration illustrated in FIG. 4.

Figure 5:
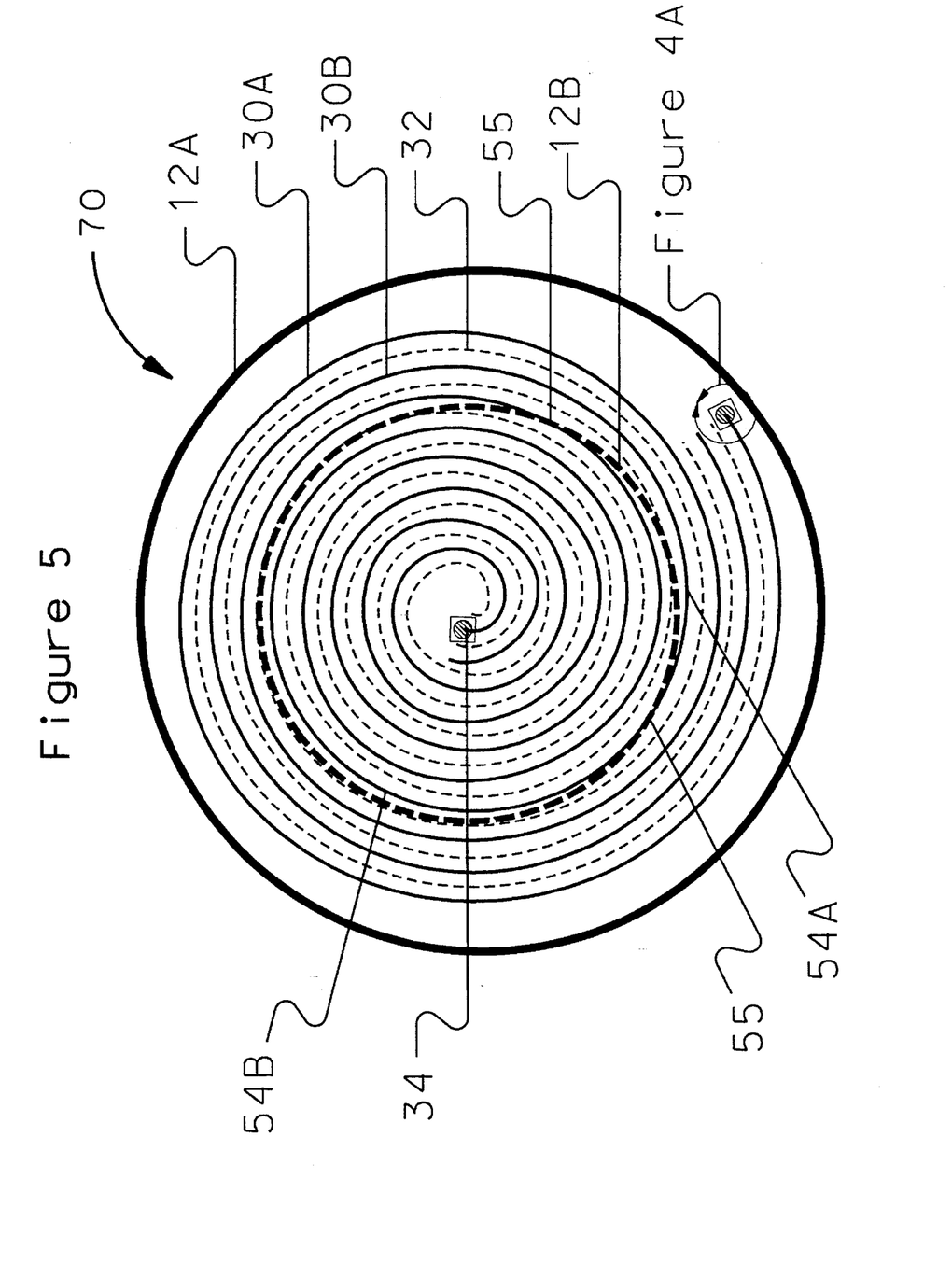
FIG. 5 is a cross-sectional view of a battery, similar to the battery illustrated in FIG. 4, except that the battery, in addition to a pair of terminal electrode, contains a bipolar electrode forming a pair counterelectrodes with the pair of terminal electrodes.

FIG. 5 illustrates, in cross-section, a bipolar electrical storage device, such as a rechargeable battery, similar to the device 60 illustrated in FIG. 4, except that this battery, in addition to a pair of terminal electrodes, also contains a bipolar electrode forming a pair counter-electrodes with the pair of terminal electrodes. The battery 70 comprises an outer cylindrical housing wall 12A and, in concentric relation therewith, an inner housing wall 12B. The cylindrical walls 12A and 12B are provided with disk shaped walls (not shown) at opposite ends thereof in the same manner as illustrated with the cylindrical battery illustrated in FIG. 4. It can be seen that each cell contains a pair of electrodes, i.e. terminal electrode 30A and a portion of a bipolar electrode 54A in the outer cell and a terminal electrode 30B and a portion of the bipolar electrode 54B in the inner cell. The mid-portions of the bipolar electrode, as illustrated by reference number 55, is embedded within a potting resin 56, as described in conjunction with the bipolar electrode illustrated in FIG. 3, but preferably is embedded within the polymeric resin of the inner housing wall 12B as it passes through the inner housing wall. The inner housing wall is shown as a broken line merely to better illustrate the passage of the bipolar electrodes through the inner wall.

Electron collectors 34 and terminals 36 are attached to an edge of each terminal electrode 30A and 30B in a manner similar to the collector and terminal connections illustrated in the enlarged view of FIG. 4A. A separator sheet 32 is positioned between the electrodes and the cell is filled with an electrolyte, all as described in connection with the preceding embodiments illustrated in the drawings.

Figure 6:
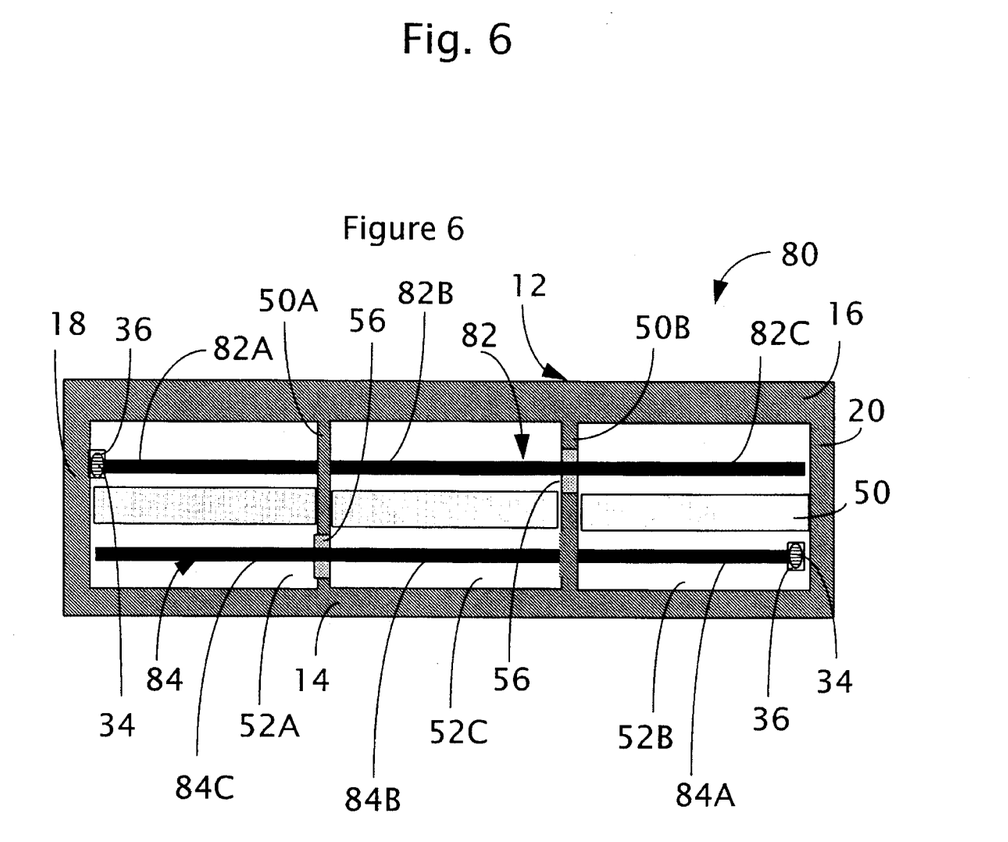
In FIG. 6, there is illustrated a cross-sectional view of a battery comprising a housing of a generally rectangular shape having an interior chamber that is sub-divided into 3 cells. The interior chamber contains a pair of flat, planar electrodes that are positioned in a facing relationship and that extend through 2 separator walls thereby occupying each of the 3 cells. Each electrode consisting of a terminal electrode and a pair of bipolar electrodes.

In FIG. 6, there is illustrated another embodiment of a bipolar electrical energy storage device such as a rechargeable battery. The battery, illustrated by reference number 80, comprises a housing 12 having a top wall 16, end walls 18 and 20, and a bottom wall 14 (the side walls are not shown). It will be apparent that the battery can stand on its side so that the walls 12 and 14 become the side walls and the walls 18 and 20 become the top and bottom walls, respectively.

The interior chamber of the housing 12 is divided by a pair of equidistantly spaced separator walls 50A and 50B forming a pair of terminal or end cells 52A and 52B and an intermediate cell 52C. A pair of planar sheet like electrodes 82 and 84 are positioned in the interior chamber in a facing relationship. Each electrode passes through the separator walls 50A and 50B so that each electrode occupies the space within each of the cells 52A, 52B and 52C. Each electrode is sealingly embedded in a potting resin 56 in the separator walls or is embedded within the separator walls itself. An electrically non-conductive, ion permeable, planar sheet like separator 50 is positioned between the electrodes and can be either in the form of a separate sheet for each cell, or in the form of a single sheet passing through the separator walls 50A and 50B and embedded in a potting resin or embedded within the material of the separator walls itself. The cells contain an electrolyte and thus form a battery with a pair of terminal cells that are separated by an intermediate cell.

One end of each electrode is provided along an edge thereof with an electron collector 34 and a terminal 36 positioned at a desired location along the length of the electron collector. Preferably, the electron collector is embedded within a housing wall so that it does not come into contact with the electrolyte obviating the necessity of encapsulating the electron collector and terminal in protective coating. The construction of the electron collector 34 and the terminal 36 is the same as illustrated in FIG. 4A.

The portions 82A and 84A of the electrodes 82 and 84 that extend into the terminal cells 52A and 52B form the terminal electrodes of the battery, while the portions 82B and 82C of electrode 82 and the portions 84B and 84C of electrode 84 form the bipolar portions of the electrodes with portions 82C and 84C forming the conterelectrodes with the terminal electrodes 84A and 82A, respectively. The construction of this cell is similar to the bipolar cell illustrated in FIG. 3, except that the electrodes 82 and 84 are planar and do not contain any sharp bends. Accordingly, the electrodes can be formed of continuous lengths of carbon fibers that can be cut to any desired length and that can be assembled so as to form planar, sheet like electrodes of any desired length that are easily assembled into a housing.

Figure 7:
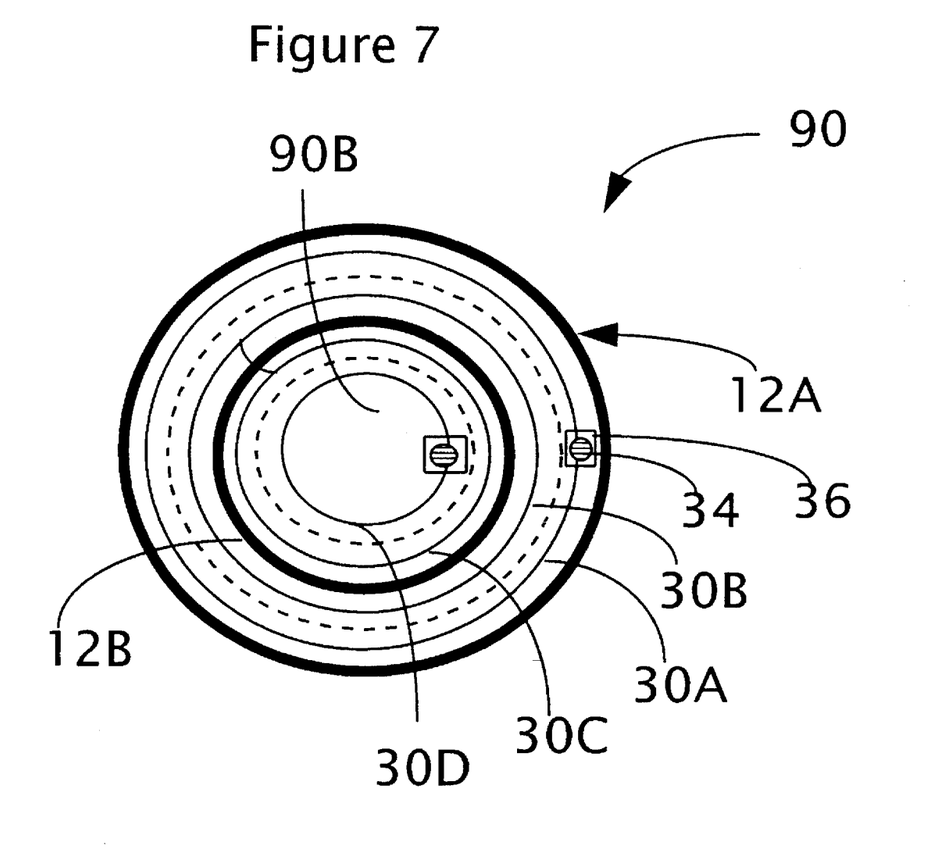
In FIG. 7, there is illustrated a cross-sectional view of a battery having a housing of a generally cylindrical shape containing a plurality of concentric, tubular electrodes, with the innermost and outermost electrodes being the terminal electrodes, and a plurality of bipolar electrodes positioned in a concentric relationship between the terminal electrodes.

In a further embodiment of the invention, the electrical storage device, such as a battery, can be constructed such that the electrodes are positioned in a concentric arrangement, as illustrated in FIG. 7. The battery, generally identified by reference number 90, is similar in construction to the spiral electrode batteries of FIGS. 4 and 5 and comprises an outer housing wall 12A and concentrically position within the outer wall, an inner housing wall 12B. The inner housing wall 12B separates the housing into a pair of cells 90A and 90B. A tube shaped bipolar electrode 30A is positioned in the cell 90A and forms a terminal electrode with a counterelectrode which comprises a portion 30B of a bipolar electrode that is concentrically positioned in a facing relationship with terminal electrode 30A in the cell 90A. Another portion 30C of the bipolar electrode is positioned in a concentric and facing relationship with an innermost tubularly shaped terminal electrode 30D. A mid-portion of the bipolar electrode passes through the inner housing wall 12B and is embedded in the housing wall in a sealing relationship to prevent siphoning of the electrolyte from one cell into an adjacent cell. An electrically non-conductive, ion permeable planar sheet like separator is positioned between the electrodes in each cell in the usual manner to prevent contact and short circuiting between the electrodes. Electron collectors and terminals are attached to the terminal electrodes in a manner similar to the attachments described in the preceding embodiments.

The following examples are exemplary of the embodiments described hereinabove.

EXAMPLE 1

A tow of acrylic fibers containing at least 1% of submicron impurities, which are not removed by micro-filtration is made by traditional spinning techniques. The tow of acrylic fibers is then oxidized in air for 1.5 hrs at 250° to 300° C. followed by carbonization at 1100° C. in a tube furnace under a purged $O_2$ free $N_2$ atmosphere for 5 minutes. The resulting fibers are flexible, have a Young's modulus of 910,000 psi, a fiber diameter of 4.5 microns and a specific resistivity of less than 0.05 ohm-cm and an aspect ratio of greater than 100:1. These fibers are useful as a battery electrode material for secondary batteries and as the conductive component for very light weight, thin, flexible measurement electrodes for a portable EKG monitor.

EXAMPLE 2

A tow of sub-acrylic fibers comprising 80% acrylonitrile, 17% vinyl chloride and 3% itaconic acid units is made by traditional spinning techniques and has a trilobal cross-section as shown in FIG. 2A. The tow of sub-acrylic fibers is then oxidized in air for 1.5 hrs at a temperature of from 250° to 300° C. followed by carbonization at a temperature of 1100° C. in a tube furnace under a purged $O_2$ free $N_2$ atmosphere for 5 minutes. The resulting fibers are flexible, have a Young's modulus of 890,000 psi, a fiber diameter of 4.0 microns, a surface area of 11 $m^2/g$, a specific resistivity of less than 0.05 ohm-cm, and an aspect ratio of greater than 100:1. These flexible carbon fibers are useful as a battery electrode material for secondary batteries and as the conductive component for very light weight, thin, flexible measurement electrodes for a portable EKG monitor.

EXAMPLE 3

Two secondary battery cells were constructed using fibers produced in examples 1 and 2, respectively, and similar in construction to that shown in FIG. 1. The electrodes of each cell comprise thin planar sheets made from tows of fibers and having a dimension of 4 $in^2$ (25 $cm^2$). A thin copper collector strip is attached to one edge of the planar electrode sheet with a terminal connector attached to one end of the collector strip. The collector strip is covered with a non-conductive DERAKANE® resin coating. A thin 200 micrometer non-woven polypropylene scrim is also fabricated and positioned between the electrode sheets for use as a separator material. An electrolyte comprising 15% $LiPF_6$ in propylene carbonate is dried to less than 5 ppm $H_2O$ using highly activated 5A molecular sieves. The electrodes and separator are dried and assembled in a dry box containing less than 1 ppm moisture. This assembly is placed in a PVC case, the exterior of which is coated, via plasma deposition, with a very thin coating of metal. The case is filled with the dry electrolyte and 1.5 g of highly activated 5A molecular sieves. The case is then sealed with the terminals of each electrode potted in a resin seal and protruding through the top of the case lid. The completed assembly is then removed from the dry box and tested as a battery cell. The cell is electrically charges at a potential of 5.0 volts and discharged to 90% of its charge capacity. The capacity of each cell is approximately 400–600 coulombs per gram of carbon and each cell has a coulombic efficiency of greater than 98%. The cell is capable of over 1000 cycles without loss of capacity or efficiency.

EXAMPLE 4

Two bipolar, two cell, batteries are constructed as shown in FIG. 3. Using the two different flexible carbon materials prepared in examples 1 and 2. The electrolyte and housing material having two compartments are the same as used in Example 3. The total thickness across each bipolar battery is approximately 1 cm. The bipolar electrode, being twice the size of the respective terminal electrodes, is passed through the cell wall connecting the two cells and potted in a DERAKANE® resin. This cell is charged and discharged repeatedly. Charging was done at a potential of 13.5 volts. Open circuit voltage on full charge is 10 volts. The coulombic efficiency is typically over 98%.

What is claimed is:

1. An electrically conductive carbon article for an electrode, wherein said article is derived from a stabilized polymeric precursor material, said carbon article being flexible and having a Young's modulus of less than 1 MM psi.

2. The article of claim 1, having a carbon content of from greater than about 85% to 99% by weight, a specific resistivity of from about 0.5 to about 0.0005 ohm-cm, and a surface area of from greater than 1 to about 150 $m^2/g$.

3. The article of claim 1, having a surface area of from greater than 10 to about 150 $m^2/g$, and a Young's modulus of from about 0.3 MM psi to about 0.95 MM psi.

4. The article of claim 1, wherein said carbon article is in the form of a multiplicity of fibers, fiber tows, or ribbons, a film, sheet, or board, a non-woven web, or a woven, knit, or non-woven fabric made from continuous filaments or staple fibers, wherein said carbon article has a bending strain value of less than 50%.

5. The article of claim 1, wherein said fibers have a non-circular or tubular cross-section.

6. The article of claim 1, wherein said polymeric precursor material is an acrylic polymer containing from about 0.01 to about 5% by weight particulate matter having a diameter of less than about 0.1 microns.

7. The article of claim 1, wherein said polymeric precursor material is a sub-acrylic resin selected from the group consisting of copolymers and terpolymers of acrylonitrile, wherein said copolymers and terpolymers contain less than 85 mole percent acrylic units and greater than 15 mole percent of one or more plasticizer polymers copolymerized therewith.

8. The article of claim 7, wherein said plasticizer polymer is selected from the group consisting of vinyl chloride, methyl acrylate, methyl methacrylate, polyvinyl chloride, cellulose esters, phthalates, adipates, and sebacate esters, polyols and its derivatives, tricresyl phosphate, caster oil, and mixtures thereof.

9. The electrode of claim 8, for a secondary energy storage device.

10. An electrode comprising the flexible carbon article of claim 1, having an electron collector conductively associated with at least one peripheral edge or edge portion of the article.

11. A secondary energy storage device comprising a housing which is liquid water and water vapor impervious, said housing having an interior chamber forming a cell, a pair of electrodes positioned in said chamber, wherein said electrodes are electrically insulated or isolated from each other, each electrode having a current collector associated therewith, and each electrode being electrically connected to an exterior of the housing, wherein at least a positive electrode comprises an electrically conductive carbon article that is flexible and has a Young's modulus of less than 1 million (MM) psi (6.89 GPa), and an electrolyte in said cell comprising an ionizable salt in a non-aqueous liquid or paste.

12. The storage device of claim 11, wherein said carbon article has a carbon content of from about 85% to about 99% by weight, a specific resistivity of less than 0.5 ohm-cm, and a surface area of from greater than 1 to about 150 m$^2$/g.

13. The storage device of claim 11, wherein said carbon article has a surface area of from greater than 10 to about 150 m$^2$/g, and a Young's modulus of from about 0.3 MM psi to about 0.95 MM psi.

14. The storage device of claim 11, wherein said carbon article is in the form of a multiplicity of fibers, fiber tows, or ribbons, a film, sheet, or board, a non-woven web, or a woven, knit, or non-woven fabric made from continuous filaments or staple fibers, wherein said carbon article has a bending strain value of less than 50%.

15. The storage device of claim 11, wherein said polymeric precursor material is an acrylic polymer containing from about 0.01 to about 5% by weight particulate matter having a diameter of less than about 0.1 microns.

16. The storage device of claim 11, wherein said polymeric precursor material is a modified acrylic resin selected from the group consisting of copolymers and terpolymers of acrylonitrile, wherein said copolymers and terpolymers contain less than 85 mole percent acrylic units and greater than 15 mole percent of one or more plasticizer polymers copolymerized therewith.

17. The storage device of claim 16, wherein said plasticizer polymer is selected from the group consisting of vinyl chloride, methyl acrylate, methyl methacrylate, polyvinyl chloride, cellulose esters, phthalates, adipates, and sebacate esters, polyols such as ethylene glycol and its derivatives, tricresyl phosphate, caster oil, and mixtures thereof.

18. The storage device of claim 11, wherein the electrolyte comprises a non-conductive, chemically stable, non-aqueous solvent and an ionizable salt dissolved therein, wherein the solvent is selected from compounds having oxygen, sulfur, or nitrogen atoms bound to carbon atoms in an electrochemically non-reactive state, and wherein the salt is an alkali metal.

19. The storage device of claim 18, wherein the electrolyte solvent is propylene carbonate and the alkali metal salt is a lithium salt.

20. The storage device of claim 11, wherein said storage device is constructed of sustaining a depth of discharge of greater than 80% at a coulometric efficiency of greater than 90% over at least 600 charge and discharge cycles without any appreciable damage to the carbonaceous electrode material due to intercalation.

21. The storage device of claim 11, wherein said storage device is constructed to sustain a depth of discharge of greater than 90% at a coulometric efficiency of greater than 95% over at least 1000 charge and discharge cycles without any appreciable damage to the carbonaceous electrode material due to intercalation.

22. The storage device of claim 11, constructed to sustain a depth of discharge of greater than 90% at a coulometric efficiency of greater than 95% over at least 1500 charge and discharge cycles without any appreciable damage to the carbonaceous electrode material due to intercalation.

23. The storage device of claim 11, having a maximum power density of greater than 0.3 watts per gram of cathodic electrode material over a 40 second period of full charge.

24. The storage device of claim 11, wherein said housing is cylindrical in shape and said electrodes have a spiral configuration.

25. The storage device of claim 11, wherein said housing is cylindrical in shape and said electrodes are positioned in said housing in a concentrically spaced relationship.

26. A bipolar secondary energy storage device comprising a gas and water vapor impervious housing, said housing forming a chamber an interior surface of which is electrically non-conductive, at least one electrically insulating separator wall for separating the chamber into at least a pair of terminal cells, each terminal cell containing a terminal electrode which is provided with a current collector, and each said terminal electrode being electrically connected to a terminal on the exterior of the housing to facilitate the flow of stored energy out of and the charge of energy into the storage device, a bipolar electrode extending from one terminal cell into the adjacent terminal cell and forming counter electrodes with each said terminal electrode, wherein said terminal electrodes and said counterelectrodes in each cell are electrically isolated or insulated from each other, said bipolar electrode being formed of an electrically conductive carbon article that is flexible and has a Young's modulus of less than 1 MM psi (6.89 GPa), and an electrolyte in each cell comprising an ionizable salt in a non-aqueous liquid or paste.

27. The storage device of claim 26, wherein said carbon article has a carbon content of from about 85% to about 99% by weight, a specific resistivity of less than 0.5 ohm-cm, and a surface area of from greater than 1 to about 150 m$^2$/g.

* * * * *